(12) United States Patent
Cross, III

(10) Patent No.: US 7,569,293 B1
(45) Date of Patent: Aug. 4, 2009

(54) METHODS AND SYSTEMS FOR EFFICIENT OPERATION OF INTEGRATED FUEL CELL-FUEL REFORMER SYSTEMS

(75) Inventor: James C. Cross, III, Melrose, MA (US)

(73) Assignee: Nuvera Fuel Cells, Inc., Billerica, MA (US)

(*) Notice: Subject to any disclaimer, the term of this patent is extended or adjusted under 35 U.S.C. 154(b) by 463 days.

(21) Appl. No.: 10/272,458

(22) Filed: Oct. 15, 2002

Related U.S. Application Data

(60) Provisional application No. 60/329,303, filed on Oct. 15, 2001.

(51) Int. Cl.
*H01M 2/02* (2006.01)

(52) U.S. Cl. .............................. 429/13; 429/19; 429/22

(58) Field of Classification Search .................. 429/24, 429/26, 35, 39, 19, 30, 13, 22
See application file for complete search history.

(56) References Cited

U.S. PATENT DOCUMENTS 3,585,078 A   6/1971  Sederquist et al.
6,218,035 B1 * 4/2001  Fuglevand et al. ........... 429/30
6,835,483 B2 * 12/2004 Ballantine et al. ............ 429/24

* cited by examiner

*Primary Examiner*—Patrick Ryan
*Assistant Examiner*—Monque Wills
(74) *Attorney, Agent, or Firm*—Finnegan, Henderson, Farabow, Garrett & Dunner LLP

(57) ABSTRACT

Methods and related systems for determining an efficient operating state for an integrated fuel cell/fuel reformer power system have been developed. Such a method forms the basis of a control strategy for an integrated system. The method describes optimization of the efficiency of operation of a power system comprising a fuel processor and a fuel cell operating in an integrated way. Maps of the operating properties of the system components are determined by experiment. For any desired power level, a unique vector of control setpoints can be calculated from these known properties of the subcomponents and the system, which vector of values can be used to set the values of system controls to a state that optimizes the system efficiency at the specified power output.

18 Claims, 6 Drawing Sheets

POINTS OF INTERSECTION OF AN
ISO-POWER CURVE WITH POLARIZATION CURVES

POWER vs I AT VARIABLE $H_2$ FLOWS

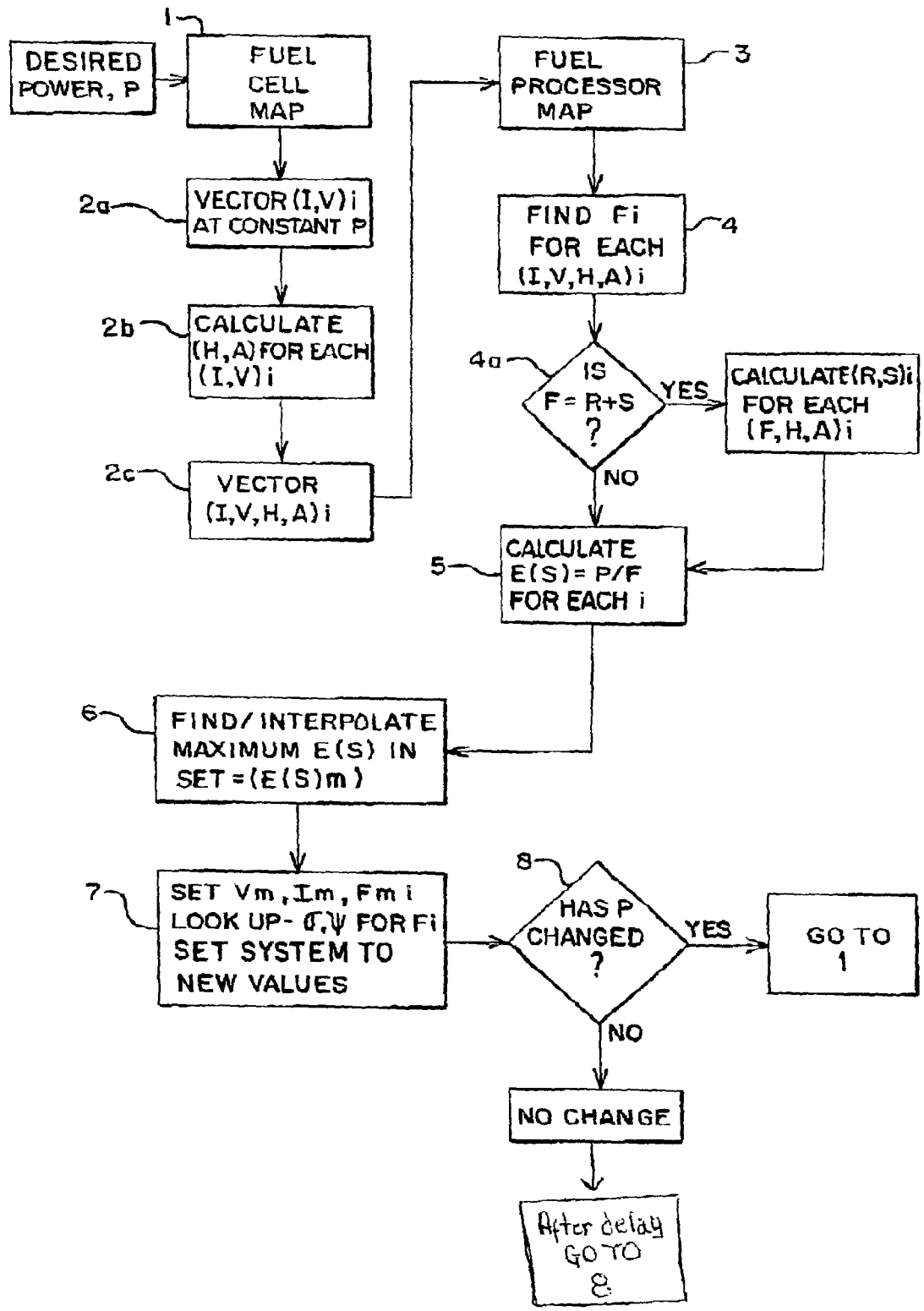

METHODS AND SYSTEMS FOR EFFICIENT OPERATION OF INTEGRATED FUEL CELL-FUEL REFORMER SYSTEMS

RELATED APPLICATION

This application claims the benefit of U.S. Provisional Application No. 60/329,303, filed Oct. 15, 2001, the entire teachings of which are incorporated herein by reference.

BACKGROUND OF THE INVENTION

Integrated power systems are being developed that comprise fuel processors and fuel cells, that are to be operated in an integrated way to produce electric power from hydrogen-containing fuels. Fuel cells are well known, and are electrochemical devices that react hydrogen with oxygen to produce electric power. The hydrogen for the fuel cell can be produced by a fuel processor.

A fuel processor is a device that produces a product gas from hydrogen-containing fuel sources and water. Air may also be used to facilitate the process. The product gas contains hydrogen, and may include diluents such as carbon monoxide, carbon dioxide, nitrogen, oxygen, water, and other species. For fuel cell power systems, the most important requirement of the fuel processor is that it must generate a product gas (generally called "reformate") of sufficient quality for reliable and efficient operation of the fuel cell. (Note that the reformate as defined herein includes the case of pure hydrogen.)

Until recently, fuel processors and fuel cells have been developed independently of each other, typically in different organizations. Each of these has been optimized in isolation. Fuel processors have been (and are being) optimized to produce reformate that is adapted for use by a particular type of fuel cell. The PEM (polymer electrolyte membrane) type of fuel cell is attractive for mobile or small applications, but it is particularly demanding in terms of reformate quality. The catalyst in a PEM fuel cell is readily poisoned by various materials potentially present in reformate, particularly CO (carbon monoxide), which is a common byproduct of the reforming process. Other types of fuel cells, including phosphoric acid fuel cells, also need reformate of a defined purity to avoid cell poisoning or other damage. Thus, development of fuel processors has focused on obtaining high quality reformate in an efficient way.

On the other hand, fuel cells have been developed with an entirely different set of objectives. Input of a suitable reformate is typically assumed. Much development effort is focused on optimization of the detailed design of the electrodes, heat exchangers, humidification equipment where required (for example, in most PEM cell designs), and overall system weight, power density, and reliability. Given the design of a fuel cell, characteristic parameters of the cell are determined. These include the polarization curves (voltage developed as a function of current drawn from the cell), the dependence of the polarization curves on hydrogen concentration in the cell (and any gradients in the concentration), and other known cell parameters.

It is not normally feasible for a fuel cell to completely consume the fuel (hydrogen), which is fed to it. In a typical integrated fuel cell/fuel reformer system (an "integrated system"), the exhaust from the anode side of the fuel cell, which contains the hydrogen that is not used, is fed back into the fuel processor to be burned as a source of energy. This energy is typically used to assist in the process of conversion of fuel (such as gasoline, jet fuel, diesel fuel, kerosene, methane, propane, ethanol or methanol) into reformate, as this process is generally endothermic (heat-absorbing).

In the initial stage of system integration, the degree of hydrogen usage in the fuel cell is typically chosen based on fuel processor energy requirements and practical heat exchanger sizes for the particular intended use, and then the system is operated so as to maintain high efficiency in each of the fuel cell and fuel reformer. In conducting such integration, it has become clear that this approach neglects impacts of stoichiometry and polarization on the system efficiency, and generally neglects optimization of the system given a level of anode gas return. Hence, it is not clear what the optimum ratio of anode bypass to input hydrogen, or the preferred selection of the voltage and current for a particular power output, should be for efficient operation of the system. Moreover, since there are many interrelated variables, it is not straightforward to determine how to operate the system with maximal efficiency.

There are numerous descriptions of electronic control of subcomponents of an integrated system, and even general descriptions of control methods for the system as a whole. However, none of these describes how to calculate the set of system parameters needed for operating the entire system in the most efficient mode.

SUMMARY OF THE INVENTION

Methods and systems for determining efficient operating parameters for an integrated fuel cell/fuel processor system have been developed. These operating parameters can be used in a method of operating an integrated system with improved efficiency. In one aspect, the procedure uses system operating maps (or any functional equivalent) that can be determined by experimental measurement of properties of the fuel cell and fuel processor to be used in the system. Given these maps and the required output power, the optimal settings for system efficiency can be easily determined in a clear and definite manner.

In one aspect, the present invention relates to a method and system for calculating an optimally efficient operating point of an integrated fuel cell/fuel processor system, given knowledge of the operating properties of the separate subsystems. The operating efficiency of the combined systems is generally different from that of the subsystems individually, particularly when, as is typical of such systems, not all of the hydrogen supplied to the fuel cell is consumed in the fuel cell. In the integrated system, the un-consumed fuel (the anode exhaust) is recycled to the fuel processor. This recycled fuel can be used to supply at least some of the heat (thermal energy) required to reform fuel into hydrogen. This diminishes the need to use fuel for this purpose, thereby increasing the efficiency of the system.

What is not known, however, is the optimal amount of hydrogen to bypass. In one aspect, the invention provides a method to select the optimal amount. The method involves calculating the overall system efficiency at a selection of values for operation of the fuel cell, all of which produce the required power output, and based upon these calculated system efficiencies, selecting an operating point for efficient operation of the system. Once the appropriate data have been determined for the parts of the system, the total system efficiency calculations can be done in a simple and straightforward manner.

In one embodiment, the present invention comprises an integrated power system including a fuel processor reforming an input fuel to produce a hydrogen output; a fuel cell receiving the hydrogen output from the fuel processor and producing an output electrical power; and a controller which receives as an input a power requirement, and which determines an operating point of the system from total system efficiencies of plural operating points which provide the power requirement, and which outputs control parameters based on the determined operating point, the control parameters being applied to control the rate of feed of inputs into the integrated power system.

In another embodiment, the present invention comprises a method for operating an integrated fuel cell/fuel reformer power system, comprising determining a plurality of operating points for the integrated system, each operating point providing a required power output; calculating the total system efficiency for each operating point; based upon the efficiency calculation, selecting an operating point for operation of the integrated power system; and operating the integrated system at the selected operating point.

In an integrated fuel cell/fuel processor system, a method for determining an efficient operating point for providing a required power output comprises the steps of determining a set of operating points of the integrated system for providing the required power output, calculating the total system efficiency at each operating point, and, based upon this calculation, selecting an efficient or optimal operating point for operation of the integrated system. The step of determining a set of operating points of the integrated system can comprise, for instance, determining a set of operating points for the fuel cell for providing the required power output, and with the set of operating points for the fuel cell, determining a corresponding set of operating points for the fuel processor for providing the required power output. The operating points for the fuel cell can include, for example, values for power output, voltage output, current output, hydrogen input and/or bypass hydrogen output. The operating points for the fuel processor can include, for example, fuel input, bypass hydrogen input, and/or hydrogen output. Calculating total system efficiency can include, for example, dividing the power output by the fuel input for each of the operating points of the integrated system.

According to yet another embodiment, the method comprises determining, preferably by experiment, certain operating properties of various subsystems of the integrated system, and particularly of the fuel cell and the fuel processor. These properties are then used to calculate settings for system operation that produce improved or optimal efficiency of the system as a whole. One step of the procedure is the calculation of points of operation of the fuel cell that are characterized by being loci of the intersection of an iso-power curve (i.e. a curve representing the relationship between cell current (I) and voltage (V) for a particular power (P)), with a polarization curve (i.e. a curve representing the relationship between cell current (I) and voltage (V) at a particular level of hydrogen or reformate feed to the fuel cell (H)). Additional points can by generated by interpolation if required. These points may be determined in any convenient representation of the fuel cell operating map, and are not restricted to use of a representation in the (I, V) plane.

In addition, a map of the operation of the fuel processor is constructed. Characteristic curves are generated showing the hydrogen output flow (H) as a function of total fuel use rate (F), and families of these curves can be determined at various rates of input of bypassed hydrogen gas (A) that are received by the fuel processor, most commonly from the anode exhaust of the fuel cell. An additional processor map can be constructed that shows the required rate of feed of water and air into the processor to optimize the efficiency of use at the required fuel and bypass feed rates. Next, values are found (by calculation and/or lookup) of the levels of hydrogen fed to the cell (H), and of hydrogen bypassed back to the fuel processor (A), that are required for the operation of the fuel cell at each value of (I,V)—the voltage and current—that was found to lie on the iso-power curve of the fuel cell. These values of hydrogen flow and bypass can then be used in the map of the fuel reformer to determine the required amount of fuel to be fed to the reformer to produce the required power output, given the assumed hydrogen input level.

Next, the system efficiency is calculated for each of these iso-power points, for each of which particular values of P, I, V, H, A, and F are now known. The optimal efficiency can then be selected or interpolated from the set of efficiency values. This value is used to calculate the appropriate rate of supply of fuel to the fuel processor that will produce the most efficient operation of the system as a whole.

Also generated by calculation and/or experiment is a zone within which the system should be operated for stability and safety, and within which the system can physically operate. Should the calculated optimal operating regime fall outside the zone of practical and stable operation, procedures are provided for selecting an efficient operation point from within this zone.

Additional refinements are possible and desirable in the system. These include incorporating into the fuel processor operating map efficiencies that are achieved from recovering heat from the cooling of the fuel cell (especially applicable in non-PEM systems). In addition, there is typically a range of variation of the amount of water that may be added to the fuel processor, and this amount can be selected to accommodate other system requirements, such as carbon formation and water management. Moreover, the system maps can be adjusted based on the operating history of the system over time, when such information has been determined for the system components.

The method of the invention is preferably implemented in an electronic control system. The implementation may be performed in any combination of hardware and software, and the hardware may be in the form of a general-purpose computer with appropriate programming, or dedicated hardware, or custom chips. The electronic controller will contain or have access to the system maps and calculation routines of the invention, and it will typically also have associated means for controlling system inputs, such as fuel, air and water, to place the system in the operating state selected by the calculation.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 10 is a block diagram of the process for determining the system efficiency.

DETAILED DESCRIPTION OF THE INVENTION

Definitions

Figure 1:
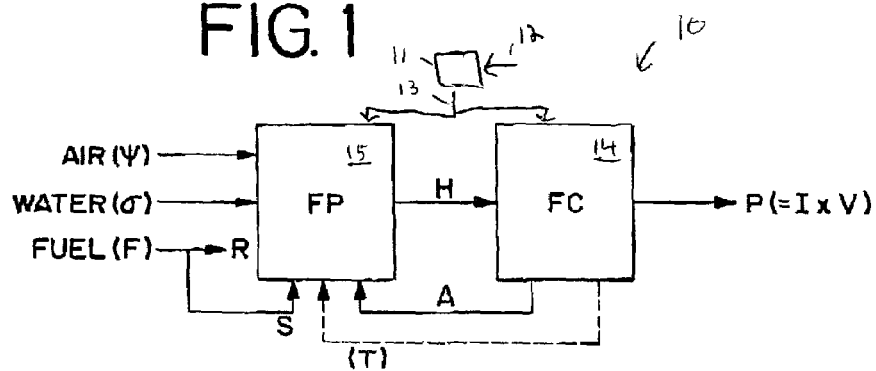
FIG. 1 is a schematic illustration of a fuel cell/fuel processor system.

As used herein, unless otherwise specified:

A fuel cell is a device that combines hydrogen and oxygen in a way that produces an electrical potential across a membrane or other separator, which potential can be used to drive current through a load to produce useful work. Fuel cells are well known, and a variety of arrangements are available, principally differing in the nature of the electrolyte. Fuel cells are often assembled in series to form fuel cell "stacks". These are synonymous with fuel cells in this description.

A fuel processor is a device that converts a fuel containing hydrogen and/or carbon into a gaseous mixture comprising hydrogen, as well as other components such as carbon dioxide. A fuel processor typically conducts multiple reactions, such as steam reforming, water gas shift, and clean-up of the hydrogen-containing reformate to meet the requirements of the fuel cell.

Flows and Values: The following symbols are used for the various flows, or values of parameters, in the system. A block diagram of the system is presented in FIG. 1, and a diagram of the process is presented in FIG. 10. The flows and may be presented in any convenient units, and will be converted to consistent units as required for calculation.

"P" is the output power of the fuel cell (FC).

"H" is hydrogen output flow from the fuel processor (FP) to the fuel cell, which may be present as a flow of reformate containing hydrogen and other gases, potentially including carbon dioxide, nitrogen, oxygen, water, and other components.

"A" is the flow of hydrogen that is produced by the fuel processor but is not consumed in the fuel cell, and that is returned to the fuel processor in a recycle mode.

"I" and "V" are the current output and voltage of the fuel cell; the power "P" is their product: $P = I \times V$.

"F" is the fuel input flow into the fuel processor. In constructing the fuel processor map, it may be desirable for some types of fuel processors to treat the fuel (F) as comprising more than one fuel stream. For example, a substream "R" can be defined for fuel used materially for hydrogen production, and a substream "S" for fuel oxidized to supply heat to the reforming reaction.

Other inputs into the fuel processor are also used throughout this specification. Sigma ($\Sigma$) is used to indicate the molar steam to carbon ratio. Psi ($\Psi$) indicates the ratio of the actual air supplied to the fuel supplied divided by the same ratio at stoichiometric conditions. (Psi is essentially the fraction of the fuel input that is oxidized to produce heat to support the reforming process.) The ratio Psi may also be represented by its inverse, conventionally designated Phi ($\Phi$) in the literature. The appropriate values of Sigma and Psi are dependent on the type of processor (e.g., pure stream reforming vs. autothermal reforming), on the fuel (methane vs. gasoline, etc.), and on the detailed design of the processor. "T" denotes heat energy recycled from the fuel cell to the fuel processor.

Efficiencies: The efficiencies of the system are the thermodynamic efficiencies of each of the operating units, including the efficiency of their transfer of gasses, or of the system. Efficiencies are abbreviated by E(X), where X is the unit. For the processor, $E(FP) = H/(F+A)$. For transfer of hydrogen to the fuel cell, $E(TR) = (H-A)/H$. For the fuel cell, $E(FC) = V/V$ (ideal) or, as used herein, $E(FC) = V/V_0$, where $V_0$ is the voltage observed at no current flow, i.e. the maximum voltage of the fuel cell at a particular temperature. For the system as a whole, $E(SY) = P/F$ is used to calculate system efficiency.

System Maps: A system map is generally a table, in tangible or electronic form, which associates various parameters of the system or its components so that operational values (settings, etc.) can be selected for the current or desired state of system operation. For efficiency calculation, two maps are described above, one in the fuel cell and one in the fuel processor. Each of these maps may have a further associated set of values, also determined by experiment, specifying particular settings of the components of the system to achieve the desired state. These include controlling primary inputs such as air and water, temperature control, and control of output regulating devices such as voltage or current controllers. These values may be represented as part of the system map, or as a separate or associated map, as is most convenient.

Water includes both liquid water and water vapor (steam) unless otherwise specified.

Fuel is the primary source of hydrogen (and its precursor, carbon monoxide). Fuel, of the same or a different type (including a non-hydrogen containing or producing type if convenient) is also burned as a source of heat to drive the reforming reaction.

Air includes any oxygen-containing gas, for example ambient or pressurized air, pure oxygen, oxygen mixed with gases not typical of air, and combinations thereof.

Hydrogen is any gas containing hydrogen, for example reformate from the fuel processor, anode gas from the fuel cell exhaust, pure hydrogen produced by purification of a reformate, or otherwise, and combinations thereof.

One challenge with integrated fuel cell/fuel processor systems is to find the correct parameters for optimal operation of the system at a particular power output from the fuel cell, when there is recycled energy flow (including heat and hydrogen) from the fuel cell to the fuel processor, or conversely. The efficient operation of each subsystem can be determined in isolation, but such a determination does not capture the effects of the energy recycling on the system operating points. On the other hand, there are a large number of variables to consider (including at least I, V, H, A, F, Sigma, and Psi, as defined above), and hence the determination of conditions providing optimal efficiencies is not readily achieved by simple variation of inputs.

According to one aspect, the present invention is directed to methods and systems for improving the efficiency of integrated fuel cell-fuel reformer systems in a simple and straightforward manner. In its general form, the invention involves selecting a variety of system conditions or states (i.e. operating points) that produce a required power output, calculating the fuel consumption in each condition, and selecting the point (or an interpolated point) that gives the required power at the lowest fuel consumption. Conveniently, the points are selected as values of I and V whose product equals the desired power output. However, other variables can be selected, although the calculations are more complex. The system may also select a point that is not the maximum of efficiency if preferred for optimization of overall operation.

The present invention may be further implemented in a system for providing improved efficiency in an integrated fuel cell/fuel reformer. This invention may be advantageously implemented by a programmable computer or dedicated data processor, for example.

In one embodiment, as shown in FIG. 1, the integrated power system 10 can include a controller 11, which is able to receive inputs 12, such as a power requirement, and which determines an operating point of the system from total system efficiencies of a plurality of operating points which provide that power. The controller also outputs control parameters 13 to one or both of the fuel cell 14 and fuel processor 15, the control parameters being applied to control the rate of feed of inputs (such as fuel, air, and water) into the integrated power system.

For convenience and clarity of understanding, an exemplary embodiment of the present method will now be described, with reference to the steps (1-8) illustrated in the flowchart of FIG. 10:

1. Determine the operating map of the fuel cell, by construction of polarization curves at varied hydrogen flow rates, or by any equivalent procedure that has the effect of assigning values of input and bypassed hydrogen (H, A) to a set of values (I,V) (or I, P; or V, P) of operation of the fuel cell or stack.
2. Calculate a set of operating conditions, in terms of voltage V and current I, that will supply the required amount of power P. (Recall that $P=I \times V$.)
   (2a). Call this set (I,V)i, where i is an index running from 1 to n, where n is the number of points. This is a set of iso-power points, which can if desired be plotted to form an iso-power curve.
   (2b). Each point in the set of iso-power points or on the iso-power curve also lies on a single polarization curve, which determines the rate of hydrogen supply H. Given H and the current I, the hydrogen bypass rate A can be calculated, since I is directly proportional to hydrogen consumed. Alternatively, the value of A can be directly measured, as described below.
   (2c). Once H and A have been determined for each point (I,V)i, the measured or calculated values can optionally be embedded in a second operating map or look-up table, or otherwise represented as a set of associated values ("vectors") (I, V, H, A)i.
3. Determine the operating map of the fuel processor, by constructing curves showing hydrogen output as a function of fuel input at various values of input of fuel, air and water. Repeat the processor map at various values of hydrogen bypass (anode exhaust) or other auxiliary fuel source (e.g. bypassed reformate) supplied to the processor. The map now specifies a definite value of fuel input F for a given level of hydrogen supply H and of anode gas return A (or equivalent). This map will typically require the creation of a section of the map to associate optimum values of water and air feed, optionally expressed by variables such as Psi and Sigma, with particular levels of generation of hydrogen (H).
4. For each point on the iso-power curve (i=1 . . . n), use the known values of H and A, determined from the fuel cell operating map, to determine the corresponding value of F from the fuel processor operating map. If the fuel is supplied in two non-interchangeable components, e.g., fuel for being reformed (R) and fuel for combustion to support reforming (S), a sub-routine that takes this into account will be performed at step 4a.
5. For each point on the iso-power curve, calculate the system efficiency, using the input variable P, the selected values of I and V, and the derived values of H, A and F (or their equivalents, in other systems of expressing the variables). In its simplest form, efficiency of the whole system is simply the output power divided by the amount of fuel supplied ($E(SY)=P/F$).
6. Determine the iso-power point having the highest system efficiency, by selection of the maximum value of system efficiency and/or by curve fitting or simple interpolation. Operation of the system in this state will maximize gross system efficiency.
7. Use the values associated with the iso-power point to select operating values of V, I, F (or R,S), H, A, and Sigma or Psi for the integrated fuel cell/fuel reformer system. Set the operating values.
8. Optionally, the control system of the integrated fuel cell/fuel reformer can be designed to re-determine the required P after a suitable interval. If required power (P) has not changed, the settings will not be changed; if P has changed, the calculation will be repeated (or, the settings associated with the new P will be looked up and used).

The two mapping processes can be done in any order or in parallel, while the calculating processes require the previous creation of the appropriate data mapping the responses of the system components. If the density of measured curves is adequate, then values between curves can be found by interpolation, which can be linear for dense data, or other than linear where an approximate functional form is known or calculated. Moreover, the system mapping can be done in any convenient set of coordinates, provided that the alternative coordinate set also captures the same set of variables. For example, the amount of air required for a given amount of fuel could be expressed either as a proportional amount, or as the conventional function "Psi", which is the ratio of the actual air supplied to the theoretical stoichiometric amount needed to completely convert the fuel to carbon dioxide and water. Likewise, the amount of water provided can be expressed in moles/second, or as "Sigma", the steam to carbon ratio. Similarly, any consistent set of units can be used; or, inconsistent units can be used during measurement and converted to consistent units during calculation.

These steps will now be explained in greater detail.

Constructing the Fuel Cell Map and Calculations

As shown in steps 1 through 2c of FIG. 10, one aspect of the invention involves generating a system map for the fuel cell, and, using this map, determining sets of operating parameters (I,V,H,A) for providing the required power output, P.

There is a relationship between the voltage at which a fuel cell operates and the current which is drawn. For a fixed rate of hydrogen input, the voltage across the cell decreases as the current drawn from the cell increases. The curve has a characteristic general shape, as shown schematically in FIG. 2 by solid lines, each taken at a different level of hydrogen input (H1, H2, etc.). As current draw increases from zero, there is a region of relatively rapid voltage decline, followed by a plateau region of slower decline, finally followed by a very rapid loss of voltage at higher currents. This relationship is known as a "polarization curve". The underlying causes of the shape of the curve are rooted in the electrochemical and mechanical details of the particular fuel cell, and are known in the art.

What is important for the present analysis is that they are a constant for a given fuel cell design, and can be used to "map" the performance of the cell.

A polarization curve is conventionally determined by supplying the fuel cell with hydrogen at a fixed rate. The amount of current that can leave the cell is controlled, for example by varying an external resistance, and the voltage across the cell at each level of current is measured. Alternative methods are possible, and give equivalent results. For example, the output voltage can be regulated while the current is measured; or, with a given resistance, either the current or the voltage can be measured, while the output power is measured and used to calculate the other variable.

In the method of the invention, the bypassed hydrogen, that is, the hydrogen in the anode exhaust, is also measured. Any measurement technique is suitable. The simplest technique is to calculate the hydrogen usage from the current: each hydrogen molecule oxidized by the fuel cell generates two electrons. Using this relationship, the hydrogen bypass can be calculated as the difference between the supplied hydrogen and the amount of hydrogen that must have been consumed to generate the observed current. During construction of the map, validation of this relationship by direct measurement of the anode exhaust hydrogen is also useful, as it gives a correction for leaks and the like. Direct measurement can also be the prime means of determining the bypass.

Well-known direct measurement techniques include, without limitation, determination of the hydrogen content by gas chromatography; by infrared, visible or ultraviolet spectroscopy; by magnetic resonance; by electrochemical sensors; or by combustion of the exhaust to determine its energy content.

In addition, the amount of heat created by the fuel cell can be determined, either by measurement of the temperatures of the exhausts and of any cooling fluid, or by calculation. (The calculation requires only determining the amount of heat liberated by oxidizing a known amount of hydrogen, which is known.) This also determines the amount of water generated by the fuel cell.

Figure 2:
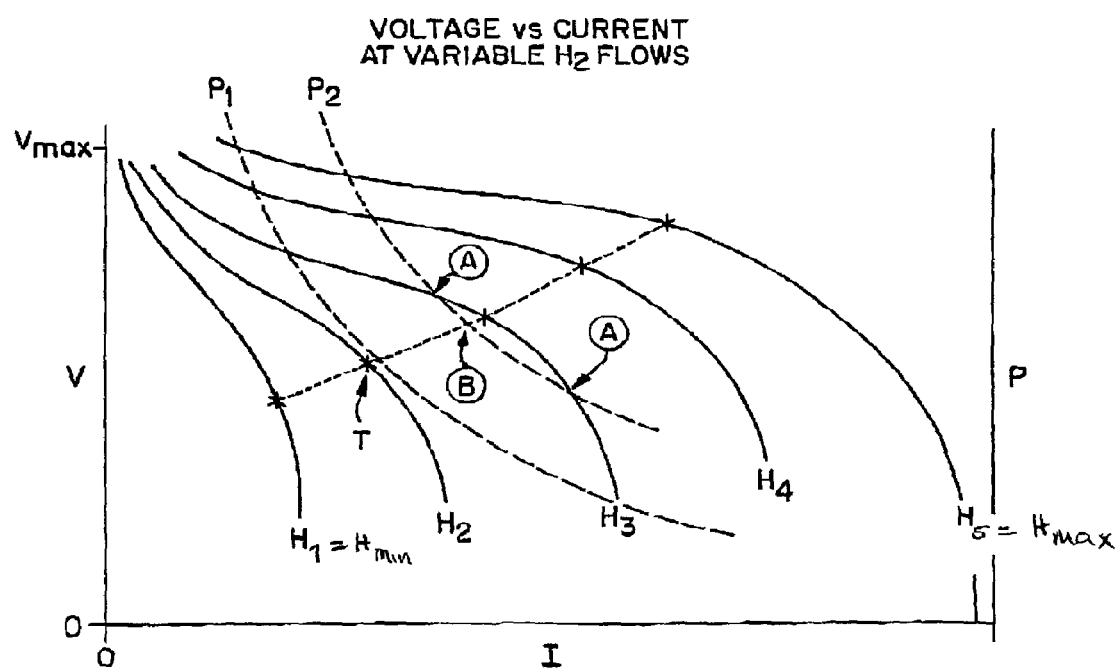
FIG. 2 is a graph illustrating the polarization curves of a fuel cell in the current/voltage plane.

To create a system map for the fuel cell, a family of such polarization curves is measured, one curve for each different level of hydrogen supply, as shown schematically in FIG. 2. For simplicity, only five polarization curves are shown. The rightmost curve corresponds to the maximum hydrogen output available from the fuel processor to be used with the fuel cell (Hmax). The leftmost curve corresponds to the lowest hydrogen flow that is practically useful in the fuel cell, or the lowest hydrogen production rate that can reliably be produced by the fuel processor (Hmin). (The ratio of Hmax to Hmin is often called the "turndown" ratio of the fuel processor.)

Once a family of polarization curves have been determined, one can calculate the power provided at each point on each curve. The power output P of the cell is simply the voltage V times the current I:

$$P=IV$$

Therefore, each point in the (I,V) plane has an associated value of power P. Moreover, at each level of required power (P*), there is a locus of points in the (I,V) plane having constant power. In FIG. 2, two of these iso-power hyperbolae are drawn schematically (dashed lines P1 and P2). It is noted that the variables I and V are conventional, especially with a single fuel cell. In a fuel cell stack, current might be replaced with current density (per unit area of membrane); or voltage might be total stack voltage, or average cell voltage.

Figure 3:
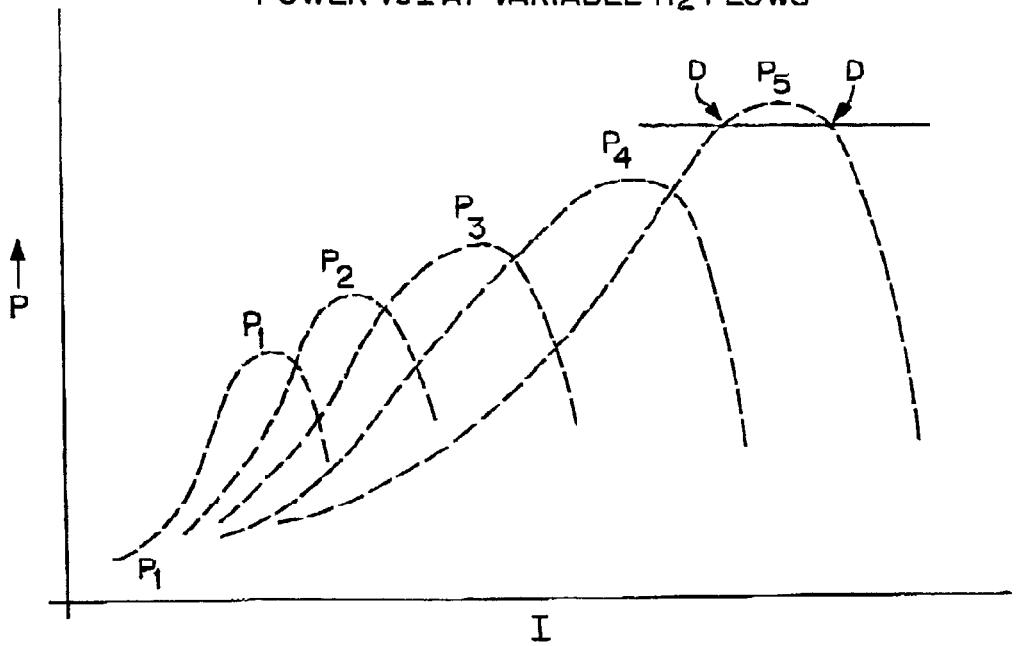
FIG. 3 is a graph showing the power output of a fuel cell as a function of current and hydrogen flow.

If the fuel cell is treated in isolation, without accounting for the effect of the anode gas on the fuel processor, then the optimum efficiency is found by selecting the hydrogen input curve that is tangent to the iso-power curve. The loci of such tangent points is shown schematically in FIG. 2 by asterisks, and can be referred to as the "H-opt" locus—i.e., the set of points at which hydrogen supply is minimal for a given power output. The relation of another iso-power curve P2 is also shown. It intersects a particular polarization curve H3 twice, offering two different loci in the V/I plane that could be selected. An alternative depiction of this situation is shown in FIG. 3. As will be demonstrated below, it is preferred for stability of operation, and will generally be preferred by the efficiency calculation to be performed later, that points above and to the left of the H-opt locus are preferred for optimal system stability and efficiency.

Figure 2A:
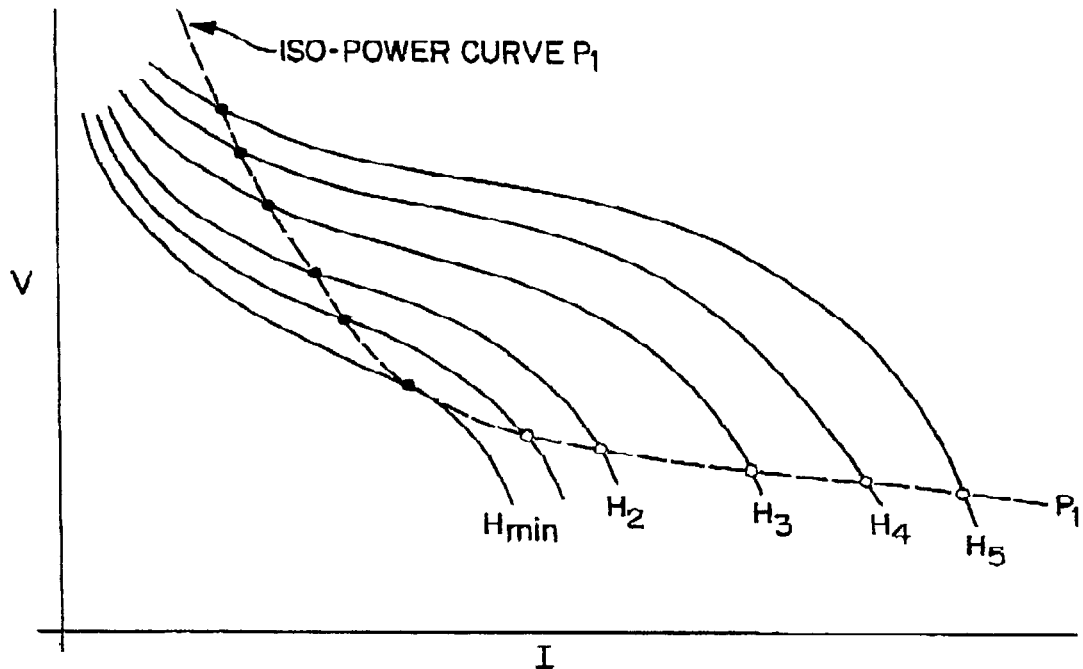
FIG. 2A is a graph showing the locus of the intersections of an iso-power curve with the polarization curves of the fuel cell map.

In order to perform efficiency optimization with fuel processor coupling, a set of points along the iso-power curve is selected at varying values of V and I. This is illustrated in FIG. 2A. The number of points is not strictly determined, but should be a sufficient number to eventually make it possible to find the optimal efficiency, directly or by interpolation. About five to twenty points are generally sufficient for this purpose; larger numbers such as 30, 50 or 100 sample points are desirable if the density of underlying experimental points is sufficient.

Ultimately, one of the points on the iso-power curve will be selected as the most efficient operating point. Selection is made by calculating the efficiency at a plurality of iso-power points and selecting the point having the best efficiency. To calculate the efficiency, data from the fuel processor map is required. First, values of H (hydrogen input) and A (anode hydrogen return) are found for each of the points on the iso-power curve. The hydrogen input (H) for each point (I,V) on the curve can be determined by virtue of the fact that each point (I,V) on the iso-power curve is either on a polarization curve associated with a known value of H, or the value of H for that point can be calculated by interpolation from the known polarization curves. Also, as outlined above, the value of A is either known via direct measurement, or can be calculated as the difference between the hydrogen produced by the fuel processor, and the hydrogen corresponding to the current drawn from the fuel cell. Values of H and A are determined in this manner for each point of the set of points on the selected isopower curve.

It should be noted that while selection of the most efficient operating point is often preferred, there are reasons why other points might be selected, once the efficiency is known. In some cases, an operating point or region near the optimum but differing in some parameter might be preferred. For example, it might be advisable to minimize the temperature in a catalyst bed, subject to a maximum loss in overall efficiency, to increase catalyst life. Such rules might most simply be applied after the efficiency calculation rather than by being integrated into the calculation.

Constructing the Fuel Processor Map and Calculations

Another aspect of the invention includes generating a system map for the fuel processor, and, using this map and the operating parameters determined from the fuel cell map, determining corresponding operating parameters for the fuel processor, as shown in steps 3 and 4 of FIG. 10. This includes, for instance, determining fuel input values, F, (or, if appropriate, values of R and S), for each operating point (I,V,H,A) on the iso-power curve. Using this data, total system efficiency (i.e. output power/input fuel) can be determined for each operating point.

The fuel processor operating map associates various parameters of the fuel processor so that operational values (settings, etc.) can be selected for a desired state of system operation. For instance, in one embodiment, the fuel processor map associates the optimal rate of input fuel, F, required to produce a given amount of hydrogen H, at various rates of anode gas, A, recycled from the fuel cell. These values are typically determined experimentally for a given fuel processor or processor design. Also, underlying these parameters are values of other fuel processor inputs and variables (such as the required amounts of water and air to achieve optimal fuel to hydrogen conversion), which can also be determined experimentally. These values can be incorporated in, or stored in association with, the fuel processor map.

The fuel processor map comprises experimental detail of the operations of the fuel processor, and may contain data related to its integration with the fuel cell. The map preferably also comprises calculation methods for obtaining derived values, as well as means, such as control algorithms, for controlling actuators to adjust levels of inputs, and to locally operate parts of the reformer and other components in a regulated state. The experimentally-determined numbers ideally include the required amounts of fuel, air and water to produce a required amount of hydrogen; and the changes to these numbers at varying supplies of recycled anode gas. The establishment of these numbers or ratios is typically more complex than in the case of the fuel cell, because there is often more than one point of injection of these materials into the processor. This is often necessary because the fuel processing process has three steps (reforming, water gas shift, and carbon monoxide removal), as described in more detail below. In addition, temperature and pressure should be considered, to the extent that they are not determined by selection of values for fuel, water, air, etc.

However, there are important constraints on the range of these variables, and these constraints, and methods of optimizing operating efficiency, are necessarily developed and understood during the development of a particular fuel processor.

The efficiency of a stand-alone fuel processor can be expressed as $$E(P)=H/F,$$

where H is the hydrogen output and F is the total fuel input, expressed in comparable units. To maximize efficiency, as little as possible of the fuel should be consumed during the reforming process. In the absence of anode gas, all of the energy required to perform the first step in the reforming reaction is provided by burning some of the fuel, either in situ (as in an autothermal reactor or partial oxidation reactor), or in a burner transferring heat to a reformer (as in a steam reformer), or a combination of these. The first step is the conversion of the un-burnt fuel, together with water, to a mixture of hydrogen and carbon monoxide. This step is endothermic (heat-absorbing), so heat must be supplied by some source. The chemistry of this step, for a typical fuel (methane), is

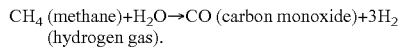
CH$_4$ (methane)+H$_2$O→CO (carbon monoxide)+3H$_2$ (hydrogen gas).

There are typically two additional steps taken to complete the fuel processing, each of which yields some heat energy. The first is the "water gas shift", in which additional water (H$_2$O) is mixed with the hydrogen (H$_2$) and carbon monoxide (CO) to yield additional hydrogen and carbon dioxide (CO$_2$):

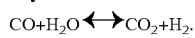
CO+H$_2$O ⇌ CO$_2$+H$_2$.

This step is slightly exothermic (heat-yielding). It is also an equilibrium reaction, so that some residual CO is always present. Some fuel cells require that the hydrogen stream have very little residual carbon monoxide. In these cases, a third step directly and selectively reacts the residual CO with oxygen to make CO$_2$:

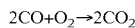
2CO+O$_2$→2CO$_2$

This step is also exothermic. With a good catalyst system the other possible reaction, reaction of hydrogen with oxygen, is very low. (However, some CO may be regenerated by the water gas shift reaction.)

Alternatively, H$_2$ separation or purification processes can be used to produce CO-free hydrogen. This may eliminate the above CO-removal step, or otherwise alter the process. A separation step can be used to generate a flow of oxidizable byproducts containing CO, and often containing some hydrogen. This material will normally be directed to a burner to prevent pollution; the resulting heat is preferably used to provide heat to the reforming step. This will produce a direct energy flow from the reformer to the burner, bypassing the fuel cell. Because these purification mechanisms occur in the fuel processor segment, whether via separation or by selective oxidation, their effect will be incorporated into the fuel processor map. For example, the bypass flow will be determined at various rates of net hydrogen generation, and the resulting heat produced will be incorporated into the map of the processor. (It will typically be necessary to also incorporate the effects of varying steam-to-carbon rations into such mapping.)

Moreover, to make the overall system as efficient as possible, the heat from the exothermic reactions is captured and recycled, to the extent possible, to the initial reforming step. Efficiency is also improved by injecting at least some of the water for the water-gas-shift after the reforming process, since the water does not have to be heated to as high a temperature. These efficiencies, which are a property of each particular reactor design, tend to reduce the amount of fuel that must be burned to produce the heat required for reforming.

There are two methods of providing heat to the fuel being reformed. In one method, often called "steam reforming", some of the fuel is mixed with air and burned, and the heat from this combustion is transferred through heat exchange, e.g. through reactor walls, to the catalyst bed in which the rest of the fuel is being converted to hydrogen and carbon monoxide. In the other method, often called "partial oxidation" (POX) or "autothermal reforming" (ATR), air is added to a mixture of fuel and water, and the oxygen in the air combines with the fuel—either via catalysts, or by burning—to generate heat directly within the stream of flowing fuel and water. In such a reactor, heat may also be supplied to the reaction directly or indirectly by an auxiliary burner, as well as by heat recycled from elsewhere in the system.

There are several constraints that must be satisfied in a fuel processor. First, the amount of oxygen or air supplied internally to an ATR or POX type reactor must be as low as possible consistent with producing enough heat for reforming. (However, air can be in excess in an "external" burner, subject to temperature constraints.) Second, enough water must be supplied to complete the conversion to hydrogen and carbon dioxide. While excess water will not significantly harm the reaction, heating excess water is inefficient. Third, specific temperature ranges need to be maintained in the various reaction steps—typically different for each step—so that the chemical reactions proceed properly on the particular catalyst used.

Fuel processors are designed to solve these problems, and a developed fuel processor will typically have a known system map. Such a map will allow operation of the system under conditions that optimize the amount of hydrogen produced from a given amount of fuel, and will also contain the rates of addition of air and water at each stage that are required to optimize the efficiency of the fuel processor. The construction of this portion of the system map is generally required to operate any fuel processor that operates at a variable level of output, and the map is highly dependent on the details of construction of the fuel processor. This is in contrast to a fuel cell, for which the map described above is reasonably general for low-temperature fuel cells, and is applicable with modification to high temperature fuel cells in which heat recycling dominates energy exchange between the fuel cell and the fuel processor. Some possible approaches to fuel processor map construction are outlined below. These approaches are not unique, and are provided to enhance understanding of the invention.

Figure 4:
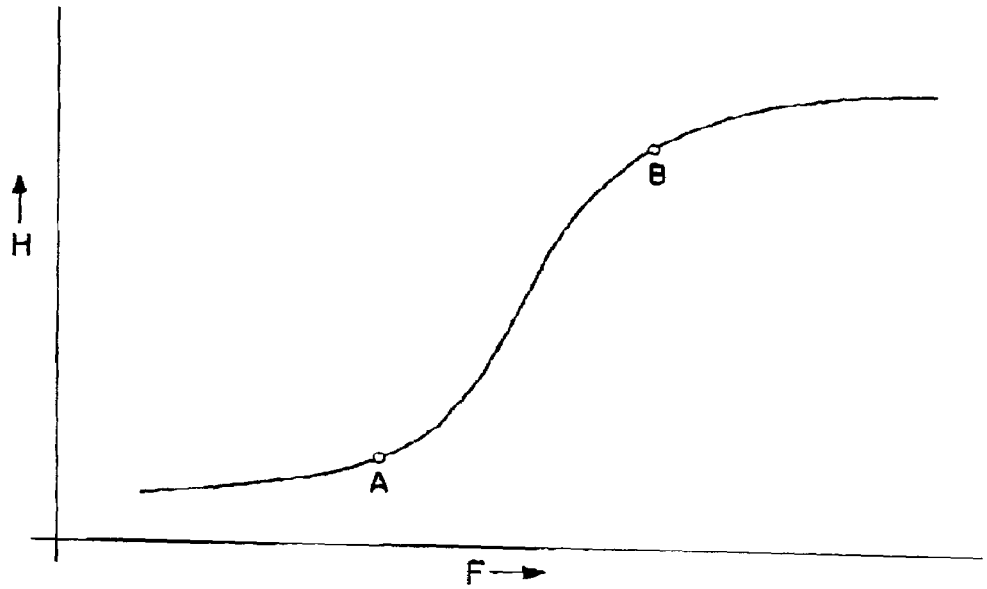
FIG. 4 is a graph showing a map of hydrogen output vs. fuel input in the fuel processor.

The optimization of the reactor operation in terms of steam and air inputs to produce hydrogen can be expressed in numerous ways. In one approach, a general processor map, that allows calculation of the effects of fuel cell integration, is illustrated by the curve of FIG. 4. The efficiency data is arranged so that a curve relating maximum hydrogen output to fuel input is produced. The curve represents the case in which there is no anode gas A being returned to the processor. The curve has an initial inefficient portion, at low fuel supply, because much of the fuel energy is needed to heat the system and keep it at the correct temperature. At higher fuel supply, the hydrogen output rises proportionally to fuel input, and efficiency increases. When fuel supply is too high for a particular reformer size, additional fuel cannot be converted, hydrogen production plateaus, and efficiency decreases. In general, all fuel processors can be characterized by such a curve.

A general fuel processor map, as shown in FIG. 4, does not account for the effect of recycled anode gas on the fuel reforming process. Anode gas has heating value, and can displace fuel that would otherwise be used to provide heat for the reforming step. The anode gas is preferably burned outside of the reforming bed, and the heat generated can be transferred to the bed either directly via heat exchange, or indirectly, for example as heated water (steam). However, it is not obvious to what extent a given level of anode gas should be used to displace fuel used for providing heat for reforming, to obtain optimal efficiency. (Note that if hydrogen is supplied to the fuel cell by separation, and if the reformer is a steam reformer, then there will be no significant amounts of non-hydrogen gas in the anode return, and this return can then be supplied to the reformer, or even after the hydrogen separation step, to displace fuel. Again, the system map can reflect such arrangements.)

In FIG. 4, for a given level of anode exhaust, more hydrogen is produced at low fuel usage rates, for example at point A, by burning the anode exhaust without changing the input of fuel, thereby raising the efficiency of the reformer. However, at higher fuel usage rates, for example at point B, it may be better to reduce the fuel input, because increase in output tends to be inefficient. Under such a scheme, a great deal of experimentation would be required to find an optimal level of provision of fuel for a given level of anode return. Moreover, even this effort will not solve the problem of optimization of the efficiency of the entire system, including the fuel cell.

Figure 5:
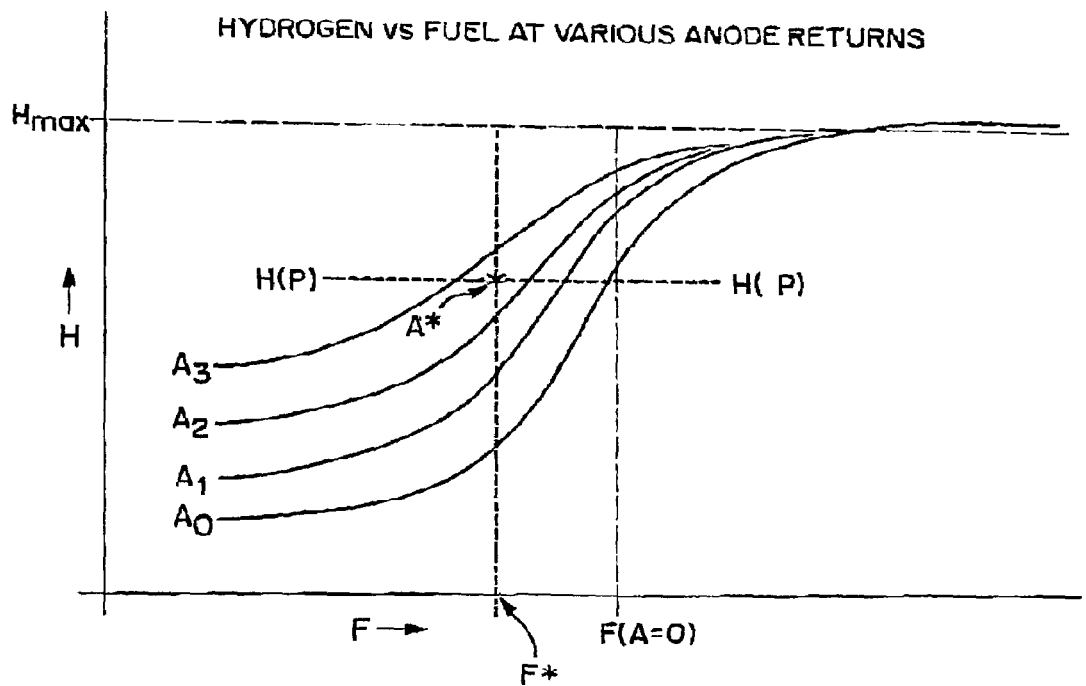
FIG. 5 is a graph illustrating, for the fuel processor, a family of curves of hydrogen production vs. fuel input, as a function of anode exhaust return.

This problem can be solved by constructing a second system map, in which the hydrogen output of the reformer is measured at a range of values of anode gas return. This can be done in several ways. FIG. 5 shows curves of hydrogen generation that are generated by adding a known amount of anode gas and varying the fuel addition rate. Four schematic curves are shown: the original curve, A0 (A=0), and three curves at increasing levels of A, labeled A2, A3 and A4. (In real curves, the hydrogen production may actually decrease at very high fuel input levels.)

Next, a value of desired hydrogen (H) output is selected, as shown by the line labeled H(P) on FIG. 5. This value of H is determined by the map of the fuel cell, which determines the required value of H for each of the points selected on the iso-power curve of the required power P*. As discussed previously, associated with that value of H is a known value of anode bypass hydrogen, A. By interpolation along the H(P) line, the corresponding value of A, A*, is found on the fuel processor map (FIG. 5; marked by an asterisk). In turn, this selects a value of F, indicated as F*. Since each of the curves represents a series of efficiency-optimized operating parameters, in terms of the values of feeds of air and water, this point also selects the appropriate feed rates, which can be looked up in a table (i.e., in the previously-mentioned detailed portion of the overall system map.). The lookup can be by hand, but is preferably implemented in electronic form, particularly since the data will typically be voluminous.

For the selected power, a set of values of I and V (i.e. iso-power points) have previously been found, each of which values is associated with a particular value of H and A. By using the above procedure, or a functional equivalent, there is now enough data available to calculate the system efficiency for each iso-power point.

System Efficiency

Having now determined, from the operating maps of the fuel cell and fuel processor, the operating parameters I, V, H, A, and F for each iso-power point on the iso-power curve, system efficiency values can now be determined for each of these operating points. Moreover, using the calculated system efficiencies for these points, an operating point for the system can be selected to maximize total system efficiency, as illustrated in steps 5 through 7 of FIG. 10.

The system efficiency E(S) of the integrated system is calculable as follows:

$$E(S)=[E(P) \times E(T) \times E(C)]/(1-[E(P) \times (1-E(T)])$$

Where, as noted above,

E(S)=Electrical power out/Total fuel into the system=P/F=V×I/F

E(P)=fuel processor efficiency=Usable hydrogen produced/Total fuel into processor=H/(F+A)

E(T)=transfer efficiency=Fraction of hydrogen used for electric power production/Usable fuel fed to anode=(H−A)/H E(C)=fuel cell efficiency=E(thermodynamic)=(Voltage/Theoretical Voltage)=V/Vo Given these definitions, the formula follows algebraically—i.e., starting with E(S)=P/F, the expression of E(S) in terms of the efficiencies of the subsystems can be derived. E(S) can also be expressed as $$E(S)=(H-A)V/FVo$$

However, the two numbers needed to calculate E(S) directly, P and F, have already been found. So E(S) is next calculated for each of the iso-power points. The maximum value of E(S) is selected, or interpolated by curve fitting, and the required fuel input $F_{opt}$ for most efficient operation of the integrated system is thereby determined, along with the operating values I and V for the fuel cell and the water, air and temperature settings for the reformer. (Or alternatively, the lowest value of F is selected, since P is a constant in this calculation.)

As noted elsewhere, the range of values on which optimization of efficiency is performed should be edited, either before or after calculation, to exclude points that lie outside the safe and stable operating range of the fuel cell or the fuel processor. So, the point giving highest efficiency available within this more restricted range is the point preferably selected, at least as a starting point, for determining the system operating parameters.

Once this point is selected, the system inputs are adjusted, under manual or preferably automatic control, to cause the system to produce hydrogen H at the required rate. The value of the fuel flow F is selected (or, as described below, the values of more than one fuel input can be adjusted), and likewise values of air input and water or steam input are determined by portions of the system map relating these values (or their proxy variables, such as Sigma and Psi) to particular fuel flow rates. In the case of automatic control, this implies that the system will contain valve actuators, pump controllers, or similar devices that can be controlled by the system control elements in response to the calculation. It is also implicit that the integrated system may have lower-level control elements for stability, such as feedback loops for control of temperatures and pressures in the system.

Other Modifications to the System Maps

The method described above is generic, and will apply to most integrated fuel cell/fuel processor systems, particularly when using PEM fuel cells. Additional considerations may apply to particular systems, or are generic effects that should be added to, if not already included in, the method of determining efficient operation.

Methane/Fuel Slip

A certain amount of fuel, and of methane reformed from fuel if different, will typically "slip" through the reformer and will be present in the reformate as it enters the fuel cell. When species harmful to the fuel cell are present, they are typically removed by absorption before entering, except when the hydrogen is being purified by membrane separation or similar means. These species are fed into the reformer as a fuel source, as noted above, and their effect can thereby be captured in the system map, as a component of anode return A.

It is possible, when the fuel is not harmful to the fuel cell, to deliberately let additional fuel slip by lowering the temperature of the reforming zone. When the energy of the slipped fuel is recoverable, as it normally is when recycling anode gas A, it may be a rational strategy to deliberately lower the reformer temperature, for example, to enhance the durability of the reformer's mechanical parts and of its catalysts. This effect can also be built into the system map, so that the map calculates the total fuel value of the anode return A as the net leftover hydrogen (total H in, minus an amount proportional to the current I), plus slip. The slip is a function of temperature, of pressure, and of steam/carbon ratio, and a look-up table for slip can be constructed so that the value of slip can be obtained from knowing these three values. Given this, the calculation proceeds as previously described.

Operational Stability

Figure 6:
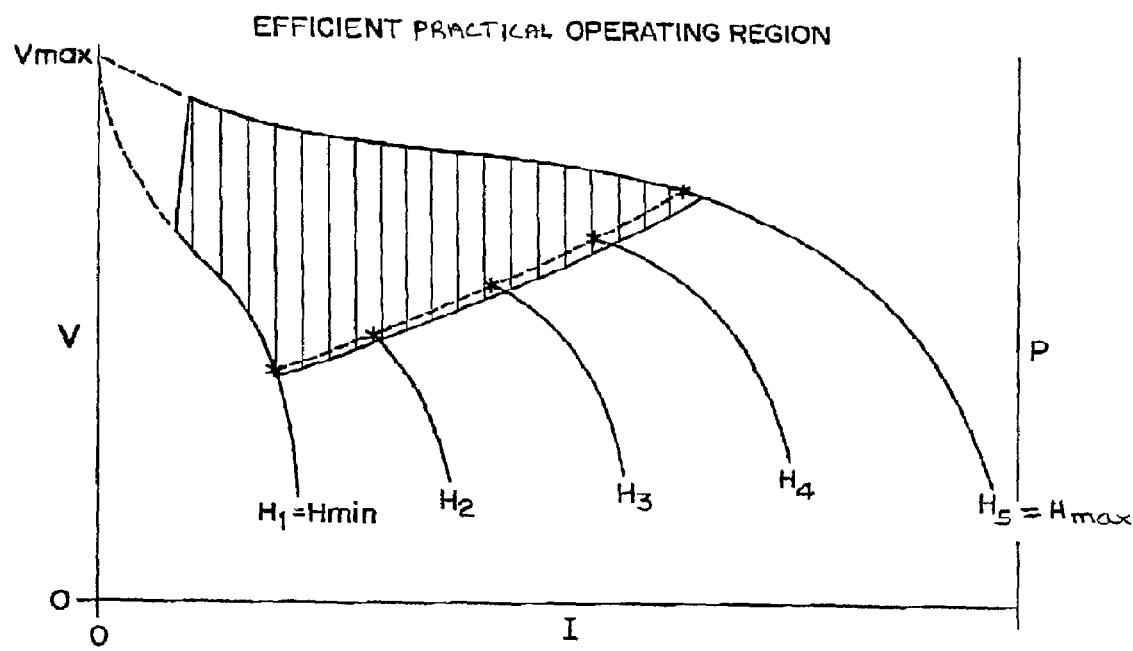
FIG. 6 is a graph showing some of the parameters limiting the range of efficient operation of the fuel processor.

In addition to efficiency, the operational stability of the integrated system must be considered. FIG. 6, which is similar to FIG. 2, shows a region of the fuel cell map in which operation is preferred. This region, shown by hatching, is bounded by the maximum and minimum rates of hydrogen supply, and by the locus of H-opt points, which are the values of V and I requiring minimum hydrogen supply to obtain a given power.

The reason for selecting against operating points "below" the H-opt line is best appreciated from FIGS. 2 and 3. For an arbitrary polarization curve, there will typically be two points on the curve at which the same power is produced (points A). It can be seen in both figures that the operating point A that is at a higher value of I is typically in a region where voltage (FIG. 2) and power (FIG. 3) decline steeply with increasing I. As a result, any unanticipated further increase in current draw I can produce negative feedback, lowering voltage and power further and in turn further increasing I. This can result in irreversible damage to the membrane or other fuel cell components. Hence, operation near to or above the H-opt locus is preferred.

This preference can be built into the system map, for example by omitting data points from regions in which it is mechanically undesirable to operate the system. (For example, the iso-power (I,V) points in FIG. 2A indicated by filled circles would be included, and those designated by open circles would be omitted.) The calculation will then tend to produce operating points that lie on or near the H-opt line, even though the efficiency might be higher at higher current settings.

Heat Recovery

Heat recovery from the fuel cell is not explicitly included in the model. While the effect may be small in simple PEM/reformer systems, the heat available for recovery could be significant in systems using most other types of fuel cells, including phosphoric acid and particularly alkaline and molten carbonate types. In general, particularly in PEM systems, the fuel cell heat is most efficiently used for other purposes, such as space heating, when such uses are available. When heat is recovered, it is generally used to evaporate or preheat reactants going into the fuel processor, including fuel, water and air. This use supplements heat recovery occurring in the processor to transfer heat from exothermic steps (water gas shift, carbon monoxide removal) to the reforming step. The heat generated in the fuel cell is proportional to the current output of the cell. (Specifically, the heat generation rate is $dQ(I)=I(Vo-V)$, for each particular (I,V) point in FIG. 2). While low-temperature heat is not used as efficiently as high temperature heat, it can be accounted for by either directly incorporating the effect of heat recovery into the fuel processor map (for example, by adding heat into heat recirculation loops during the mapping of the fuel processor system map at various values of A), or by calculating the effective fuel equivalent of the recovered heat and reducing fuel input by an appropriate factor. When the system will recover large fractions of the heat required for reforming from the fuel cell heat, then direct integration of this effect into the construction of the system map may be the best approach. Heat recovery may also be accounted for by iterative computations, which are easily done by a computer. There are also designs that recover heat from both the fuel cell and the fuel processor, and use that heat to expand gases driving a turbine or other expander (see for example commonly-owned copending application Ser. Nos. 09/870,412 and PCT/US01/17437 which are hereby incorporated by reference). The heat removal effects of such a system can be incorporated in the construction of the processor system map, while the net power produced by the expander adds to the system output power, and thus can be subtracted from the power required to be provided by the processor/fuel cell portion of the system.

Finally, it should be noted that the overall heat loss by the system is inherently included in the system maps, which are constructed experimentally using actual processors and fuel cells.

Effect of Separation of Hydrogen from the Reformate on the Efficiency Calculation In some designs, the problem of CO removal before reformate enters the fuel cell is solved by purifying the reformate flow to contain only hydrogen. This is most frequently done by hydrogen-specific membrane separation, or by hydrogen specific absorption (and later release) on an absorbent bed.

When hydrogen is separated from the reformate in this manner, the retentate (i.e., the material removed from the hydrogen stream) will typically contain materials having heating value, including residual hydrogen, carbon monoxide, and fuel or methane. If only to prevent air pollution, the retentate will typically be burned. The heat value of this burning can be used either directly to assist in reforming, or can be recycled into the reformer as described above for heat from the fuel cell. This additional heat value can be taken into account in the methodology for described above. In the first case, for example, where the burned retentate directly assists in reforming, the heat value of the retentate will supplement bypassed hydrogen flow, A. In the second case, where the heat from the burnt retentate is recycled into the reformer, the heat will be accounted for as previously described for fuel cell heat. The heat value of the retentate will need to be determined by calculation and/or direct measurement, and this can constitute another entry in the system map of the fuel processor. Once this effect is accounted for, the optimization calculation proceeds as previously described. Options for hydrogen recycling are noted above.

Parasitic Power Losses

System efficiency is decreased by the use of electric power to operate pumps, compressors, fans, voltage regulators, power converters and the like. Direct power parasitics add to the demanded power, but do not otherwise affect the system operating map. In other words, the power target is the sum of the power required doing external work—for example, propelling a vehicle—and the power required by parasitics. The total required power is the number used to set system operating conditions. In one mode, the total required power is the sum of the parasitic power demands and the output demand, and so the parasitic effects are built into the system map. This requires that the integrated system be operated and the parasitic power loads be monitored as a function of demanded output power. Then the available power as a function of total power output is known, and can be used to calculate system sizing, maximum permitted power demand, and other system limitations.

Other forms of parasitic power loss do not appear directly as a demand for electric power output—for example, the compression of air, which may be partially offset by an expander in the system exhaust. The offset energy demand can be built into the system map of the processor or the fuel cell, as appropriate, while any residual power required will be included in the total demanded power for the system as described above.

An alternative way to integrate the effects of parasitic power drain, that can also incorporate the effects of power uses such as the charging and discharging of batteries, is to use surrogate measures of system power demand as replacement or supplement for the value of P, the required power. For example, if the system has a voltage converter or conditioner, then the output voltage, or the voltage or current in an intermediate stage of conversion, can be compared against a reference value. This can be used to sense whether the system has a deficiency or surplus of hydrogen being fed to the fuel cell (as a deficiency or surplus of voltage from a reference value). The system controller can then, if supplied with appropriate conversion factors, estimate the required amount of power required to balance the current demand. Then the optimization routine can be re-run with the higher power demand, and operating conditions re-optimized for this level. To prevent system oscillations, standard damping techniques can be used, such as delays in change of conditions to allow for system lag time, or input filtering, or allowing only part of the change in hydrogen level to be demanded per cycle, or the like.

Units, Iterative and Reverse Cycles

The invention has here been set forth in a particular embodiment, and presented in a simple fashion to allow appreciation of the principles of the invention. With this understanding, various modifications can be made to the method and system described herein without departing from the scope of the invention.

For instance, the maps and calculations can be performed in any convenient units, and these can be reconciled during data processing, whether manual or automatic. Also, the maps have been described as being created by specific procedures. Alternative procedures can be used to obtain maps that have the same effect. For example, the polarization curves have been described as being taken at constant hydrogen flow. They could also be obtained by varying hydrogen flow at any of constant power, constant current, or constant voltage, and a functionally equivalent map could be obtained. Likewise, the fuel processor map was described as the loci of maximum hydrogen output at varied fuel flow rate given known amounts of bypass hydrogen A. Such maps could also be generated at constant F and variable A, for example.

Moreover, the procedure can be calculated in a reverse direction. As presented, the fuel cell parameters are calculated to yield a set of possible operating values, and then the fuel processor operation is set to provide power most efficiently from among the fuel cell values. This can be efficient as no iterative calculations are required. However, computer processing power is relatively inexpensive, and there is no practical obstacle, given the operating maps, to reversing the procedure. In such a procedure, the system calculates the required hydrogen output (for the desired power level) based on the processor map, and then calculates a correction to the required fuel supply based on the predicted bypass anode gas, using the fuel cell map. This would be close to the desired result, although probably not exact. Any difference in the hydrogen produced could be corrected by repeating the calculation cycle, or by linear interpolation, or by other mathematical methods of similar effect.

Effects of heat recovery can likewise be accounted for by iteration. The same result as that produced by the procedure described can be quickly produced by an automatic data processing system, and so a system based on successive approximation is also encompassed by the invention.

Data Representation

The data derived from the system operating maps can be stored in any convenient form. In one form, they can be stored as a table. In another aspect, they can be used a basis for deriving a functional equation describing the data set. In another form, values can be calculated from the original data and stored as a subsidiary table or vector, i.e., as an additional part of the map. For example, the efficiencies could be pre-calculated, and the result stored as a fitted curve relating the required efficient fuel input for any desired power output.

(Such a curve would potentially be simple enough to allow some manual control of the system.) All of these different types of representation, which may also include any combination of these representations, are alternative methods for achieving the aim of the inventive process.

Alternative Processor Maps

An alternative method for determining the processor map and calculating the system efficiency is presented, to illustrate some of the possible variations that fall within the scope of the invention. In this alternative, the fuel entering the system includes a first fuel stream, R, which comprises fuel entering the reformer, R, and a second fuel stream, S, which comprises fuel entering the associated burner. For example, the reactor may be a steam reformer, having a fuel flow into the reformer R and a fuel flow to a burner, S. For any values of R and S, there exists a preferred set of operating setpoints, especially in terms of addition of primary reactants such as air and steam, which optimizes hydrogen production. However, there are limitations on the relative ranges of these variables that limit the feasible operating range of the system. For example, the ratio of R to S cannot exceed certain limits. If S is too low, insufficient heat will be generated; if S is too high, temperature will be excessive and fuel will be wasted. In general, as between R and S, only S can be replaced by the heat value of anode return A, since replacing the fuel being reformed (i.e. R) with anode return dilutes the reformate. This is undesirable for a number of reasons. In a system in which air is introduced into the reforming bed for local creation of heat, such as Autothermal reforming or Partial Oxidation, use of A to replace S is preferably conducted by making heat with A outside the bed, and correspondingly reducing the amount of oxygen and excess ("S-type") fuel introduced into the bed over that amount that is to become reformate.

Figure 7:
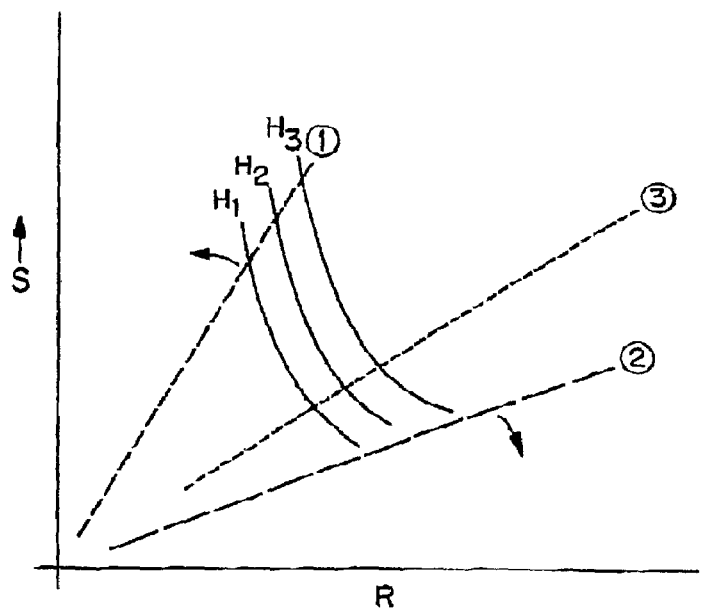
FIG. 7 is a graph illustrating the relationship between fuel (R) entering the reformer and fuel (S) entering an associated burner.

For example, in FIG. 7, a schematic relation between R and S is shown. Where ratios of S to R are high (above and to the left of line 1), there will be an increase in the exhaust temperature, and excess steam generation is possible. Below and to the right of line 2 where the ratio of S to R is low, there will be insufficient steam to complete the reformation reactions, or extra air will have to be admitted to an ATR-type reformer, potentially decreasing efficiency. Line 3 shows the design S vs. R ratio, which a priori is the expected region of highest efficiency.

Figure 8:
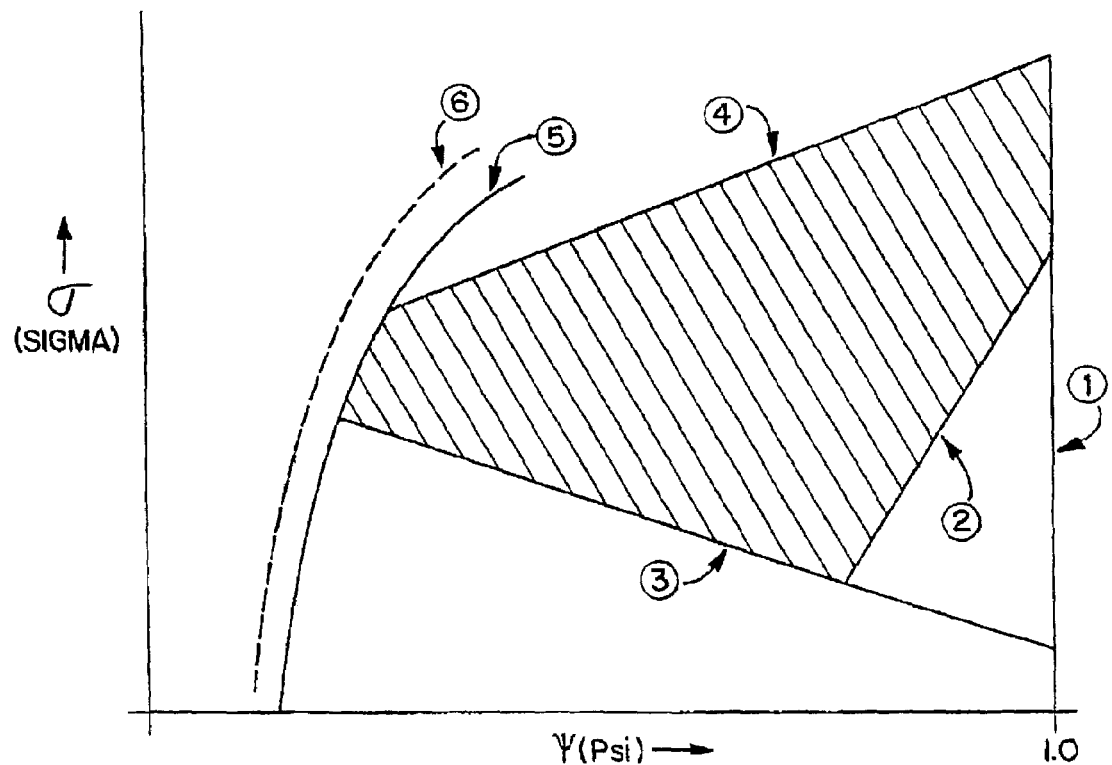
FIG. 8 is a graph illustrating some of the feasible combinations of air and water addition in a fuel processor, expressed in terms of Sigma ($\sigma$) vs. Psi ($\psi$), i.e., steam to carbon ratio vs. percent of stoichiometric air.

More broadly, a reformer faces a variety of intrinsic system limitations, illustrated schematically in FIG. 8. The hatched zone, the zone of feasible combinations of air and water addition, is expressed in terms of Sigma vs. Psi, i.e., steam:carbon ratio vs. % of stoichiometric air. The zone is bounded on the right by line 1, which is the line where Psi reaches 1 and no hydrogen can be produced. Additional area is excluded by line 2, which delineates a zone of overheating (too much air burning relative to steam generation and reformation; similar to the area below line 2 in FIG. 7). Below boundary line 3, the system is too low in steam for the temperature, causing creation of at least one of excess carbon monoxide, excess methane, and coking. Boundary 4 is set by the maximum capacity of the steam boiler heat exchanger, setting a limit on the relative amount of steam that can be generated at a given rate of air use. Boundary 5 is the thermal quench line. To the left of line 5, not enough heat is generated to reach reforming temperatures. This line shifts somewhat to the left (e.g., line 6) as heat losses from the system are reduced. The map in FIG. 8 is generally obtained in rough outline by calculation and refined by experiment. Points outside of this zone are not included when optimizing for efficiency.

Returning to FIG. 7, within the allowed zones, optimal hydrogen production is obtained experimentally for a range of points of S and R. The experimentation is guided by the design steam/carbon ratio, Sigma, as noted above. Then lines of equivalent hydrogen production are obtained, as shown in FIG. 7 as H1, H2, H3, etc. The shape of these lines is determined by a rapid plateauing of hydrogen production with excess steam, because there is a maximum amount of hydrogen producible from a given level of R; while at low levels of S (i.e. low levels of heat), hydrogen production is limited by incomplete conversion of fuel to hydrogen, since there is not enough heat to complete the reforming reaction.

Figure 9:
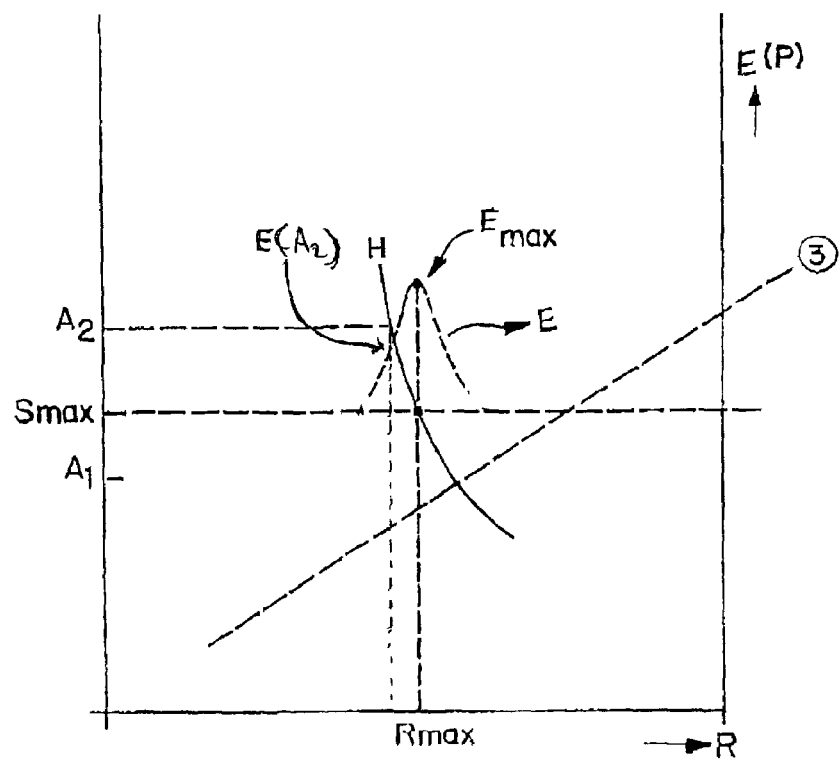
FIG. 9 is a graph illustrating one method fro the selection of a hydrogen supply rate (H)

To determine optimal values of R and S, values of H are selected, as in the embodiment discussed above, using the output power requirement (P) and the various values of H associated with the fuel cell iso-power curve. Selection of one value of H is shown in FIG. 9. In a case when no fuel return (A) from the fuel cell is admitted, a preferred value of S and R can be obtained by calculating the efficiency $E(P)=H/(S+R)=H/$(total fuel F) for each point (R, S) on the H curve, and using the efficiency calculations, selecting the most efficient operating point, $R_{max}$ and $S_{max}$, on the curve. This process is repeated for each value of H corresponding to a previously-determined point on the fuel cell iso-power curve, so that each point on the iso-power curve (i=1 . . . n) will have associated with it values of R and S.

However, this approach does not take into consideration the effect of the anode return, A, on the preferred R and S values. When the value of A is taken into account, the preferred values may change. As discussed above, some amount of S can be replaced by the heat value of anode return A. This is shown in FIG. 9 for two values of anode return, A1 and A2. Note that A is taken as directly replacing S for this example, although direct replacement might not be the case for some types of reformers. (In other cases, the substitution ratio of S by A would be determined experimentally and mapped).

When the value of A is taken into consideration for a given value of H (note that both H and A are known for each point on the iso-power curve), the preferred values of R and S can be determined as follows. For A1, which is less than $S_{max}$, the solution appears clear: the amount of S provided is reduced from $S_{max}$ to the difference between A and $S_{max}$. Since the same total heating value is supplied, the fuel processor local efficiency curve (the dotted curve in FIG. 9 with a maximum at $R^{max}$) does not change. However, for anode return value A2, which is greater than $S_{max}$, S is zero (i.e., negative values of S are not allowed). In this case, there would appear to be excess A production, implying that the fuel cell point selected may not be optimal. The local effect of this is noted by selecting the point of intersection of the A2 line with the H curve. At this amount of A2, there is a reduction of the amount of reforming fuel, R, which needs to be supplied (i.e. the excess heat diminishes the amount of fuel slip through the reformer, so less fuel is required). This value of R extrapolates to a point on the local efficiency curve that is less than optimal (marked E(A2) on FIG. 9). Whether or not this is the point which provides optimal total system efficiency is determined by completing the calculation of the entire system efficiency for that value of A, given the total power required, P.

In either case, we have established values of S and R, and hence of total fuel input F, for each of the values of H from the fuel cell iso-power curve.

Next, we calculate system efficiency for each of the H values, as $E(S)=P/F=P/(S+R)$ just as before, and select the point of maximum efficiency. This will not necessarily be exactly the same result as that obtained above (in the earlier discussion of system efficiency). The reason is that F is not differentiated in the above, while now the reactor design does not necessarily have complete interchangeability between the two fuel end-uses S and R. Thus, the detailed design of the system maps is dictated by the detailed design of the system, even though the overall optimization principle is the same.

FIG. 10 illustrates an option for incorporating these considerations into the process of determining system efficiency. In step 4a, the system determines if it needs to consider the division of F into R and S portions. Such a division may not be required in some operating states, for example idle, or near full power. If consideration is needed, then the limitation that A may not be more than S, or more than some fraction of S (such as 70%, or 120%, or whatever value may be required by the details of the particular fuel processing system), is inserted into the calculation as outlined above.

Transients and Overrides

There are some circumstances in which operating at maximal efficiency is not the primary goal of system control, and under such conditions the control system may or will select alternate criteria for determining the operating state of the system. Such conditions may include startup, shutdown, transients in demanded power, out-of-specification conditions in system components, and failures of system components. The system controller will typically be programmed to maximize operator safety and prevent or minimize damage to the system under such conditions.

Hydrogen Storage and Battery Charging

Some fuel processor systems will have means for intermediate storage of hydrogen or reformats. These may be used for fast system startup, providing electricity while the reformer comes up to operating temperature. These stores may be refilled during system operation, whenever the system is operating at less than maximum output. Likewise, batteries used at startup or to provide peaking power will typically be recharged during operation.

In operation, the control system is likely to use criteria other than efficiency during startup and transients, as noted above. Replenishment of stores, however, would typically be done efficiently. The control system can easily incorporate such recharging in the efficiency calculation. For example, hydrogen being diverted to storage would be added to whatever hydrogen level was needed for providing electric power, and then the operating point would be selected based on total hydrogen output needed. Likewise, power flowing to batteries would be added to the power demanded for operations, and this total power would control the amount of hydrogen demanded, etc.

System Aging and Deterioration

Over time, the properties of the fuel cell power system may be expected to deteriorate. Maximum or effective cell voltages may decrease; catalysts may become less active; response times in the mechanical parts may increase. The control system and the system maps can be structured to accommodate expected and unexpected deterioration in any or all of several ways.

For example, when a particular system design has accumulated significant operation experience, it may be possible to construct time-dependent system maps, and the system maps can be adjusted, using stored parameters, as operating time accumulates. Instead, or in addition, the system can perform internal diagnostic tests and adjust system operating points accordingly. Diagnostics may also be performed externally at regular service, or after system failures, and new data can then be entered into the system maps.

Moreover, during operation of the integrated fuel processor/fuel cell system, the system is continually producing "experimental results" that reflect the actual physical state of the system components. Hence, the control system can be programmed to "learn" the actual details of the performance of the particular system at the time of operation. For example, actual hydrogen levels in the hydrogen supply H and the anode return A could be measured, directly or indirectly, and used to refine the calculation. Actual hydrogen output from the fuel processor can be used to refine values of water or air input by observation, by the control system, of the effects of different values of these parameters at measured values of fuel input F and anode bypass A. It is also possible to set limits on the variation of original parameters that the system is permitted to make, to prevent severe system performance degradation between maintenance intervals.

In general, system maps can be updated as further information about the system becomes available. The efficiency optimization methods in any of these cases would then operate as before, but using new data in the system maps.

Modifications and Considerations for Particular Types of Operating Systems

The above procedure has been described in isolation from the other components of an actual system, in which the fuel processor/fuel cell unit will be coupled to a functional purpose, such as driving a motor vehicle, or providing both power and heat to a house. Modifications will typically have to be made to the above-described optimization method to accommodate further limitations imposed by the needs of the entire system. For example, in a car, total heat generation may be limited by the capacity of the radiators in the system, and this limitation will have to be reflected in at least the operating maps, as a zone in which the system cannot be operated. In a house, the amount of heat needed to heat the house will vary, and the need to generate a particular amount of heat may demand the burning of more fuel than would be optimally efficient for electricity generation via the fuel cell. The system can be programmed to deal with this situation by diverting as much low-value heat as possible to meet the heating demand, thereby decreasing the recycled-heat contribution to the fuel processor; and to, if required, burn additional fuel in a burner and feed the resultant heat to the house. Once the appropriate heat transfer efficiencies are known, the fuel needed to meet excess heat demand can simply be added to the fuel demanded for efficient operation of the fuel cell, which can be calculated as described above. Thus, the procedures of the invention will also be useful even when the integrated system is further integrated with a larger functional unit.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of operating an integrated power system comprising a fuel cell and a fuel processor at a required power output, comprising:
   determining a plurality of operating points for the fuel cell for providing the required power output, each operating point comprising operational values for fuel cell voltage, fuel cell current, input hydrogen, and bypass hydrogen;
   determining a plurality of operating points for the fuel processor for providing the input hydrogen to the fuel cell at the required power output, each operating point for the fuel processor corresponding to an operating point for the fuel cell and comprising operational values for the fuel input, hydrogen output, and input of bypass hydrogen from the fuel cell;

calculating the total system efficiency for each operating point for the fuel cell and corresponding operating point for the fuel processor, wherein total system efficiency is calculated as power level divided by the fuel input;

based upon the total system efficiency calculation, selecting an operating point for operation of the integrated power system; and operating the integrated system at the selected fuel cell operating point and fuel processor operating point.

2. The method of claim 1 wherein the integrated system is operated at the selected operating point by controlling the rate of feed of inputs to the integrated system, the inputs including at least one of fuel, air, and water.

3. The method of claim 1 wherein the required power is the power required for an end use, and equals the power output of the fuel cell, corrected for parasitic power demands, hydrogen storage or consumption, and battery charging or discharging.

4. The method of claim 3 wherein the end use power is further corrected for the power consuming or creating effects of an integrated turbine.

5. The method of claim 1 wherein the information required to calculate the efficiency is stored in an electronic device.

6. The method of claim 1 where the operating point selected is the point characterized by the highest total system efficiency.

7. A method of operating an integrated power system comprising a fuel cell and a fuel processor, the method comprising the steps of:
  a. constructing an operating map of the fuel cell, wherein said map contains one or both of:
    i. values of hydrogen supply required for production of a desired level of power, and
    ii. calculation procedures for determining such values of hydrogen supply using stored data;
  b. constructing an operating map of the fuel processor, wherein said map contains one or both of:
    i. values of fuel supply required for production of the level of hydrogen production required, given a level of anode bypass gas, and
    ii. calculation procedures for determining such values of fuel supply, using stored data;
  c. specifying a required level of power output, (P);
  d. determining from the operating map of the fuel cell a set of values of current (I) and voltage (V) that will produce the specified level of power output;
  e. calculating the required rate of hydrogen supply (H), and the associated values of anode gas bypass (A), for each of these sets of values of I and V;
  f. determining from the operating map of the fuel processor, given the rate of hydrogen supply (H) required by the power output and the associated rate of anode gas return (A), the rate of fuel to feed to the processor;
  g. determining the overall system efficiency for each of the set of values of F, H, and A, by one method selected from calculating the efficiency using the formula:

efficiency=P/F, and of noting the value of F;

h. finding by calculation the highest efficiency available along the curve described by the set of points, or equivalently finding the lowest value of fuel consumption (F); and
  i. selecting the values of I, V and F associated with that point to set the operating parameters of the integrated system.

8. The method of claim 7 further comprising using the selected values to alter the rate of feed of inputs into the system so as to place the system in a desired operating state.

9. The method of claim 8 wherein the alteration of the feed rates is controlled by an automated system component in response to results of the efficiency calculation.

10. The method of claim 7 wherein the set of values on which the efficiency is to be calculated are selected to lie within certain selected regions of the system map.

11. The method of claim 7 further comprising the step of precalculating the optimized operating values for each power level.

12. The method of claim 11 further comprising the step of storing the optimized operating values for each power level in the system.

13. The method of claim 12 further comprising means for interpolation between precalculated values so as to allow the operation of the system at any desired power level that can be delivered by the system.

14. A method of operating an integrated power system comprising a fuel cell and a fuel processor, the method comprising the steps of:
  a. specifying a desired level of power output (P);
  b. determining a set of values for current (I) and voltage (V) that will produce the specified level of power output for the fuel cell;
  c. calculating the rate of hydrogen supply (H), and the associated rate of anode gas return (A), for each of the paired values if I and V;
  d. determining, given the required rate of hydrogen supply (H) and the associated rate of anode gas return (A), a rate of fuel feed (F) to the fuel processor;
  e. determining overall system efficiency for each set of values of I, V, and the associated values A, H and F, for a particular desired power level P;
  f. determining an optimal efficiency point among the system efficiency values at the same desired power level P; and
  g. selecting the values of I, V, and F associated with the optimal efficiency point to set the operating parameters of the integrated system.

15. The method of claim 14 further comprising the step of constructing an operating map of the fuel cell.

16. The method of claim 15 wherein the operating map of the fuel cell comprises at least one of:
  a. values of hydrogen supply for production of a desired level of power; and
  b. calculation procedures for determining such values of hydrogen supply using stored data.

17. The method of claim 14 further comprising the step of constructing an operating map of the fuel processor.

18. The method of claim 17 wherein the operating map of the fuel processor comprises at least one of:
  a. values of fuel supply required for production of a desired level of hydrogen, given a level of anode bypass; and
  b. calculation procedures for determining such values of fuel supply using stored data.

* * * * *

UNITED STATES PATENT AND TRADEMARK OFFICE
CERTIFICATE OF CORRECTION

PATENT NO. : 7,569,293 B1
APPLICATION NO. : 10/272458
DATED : August 4, 2009
INVENTOR(S) : James C. Cross, III It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1070 days.

Signed and Sealed this

Seventh Day of September, 2010

David J. Kappos
*Director of the United States Patent and Trademark Office*